United States Patent
Taniguchi et al.

(10) Patent No.: US 12,129,764 B2
(45) Date of Patent: Oct. 29, 2024

(54) TURBOCHARGER GAS CASING AND TURBOCHARGER

(71) Applicant: Mitsubishi Heavy Industries Marine Machinery & Equipment Co., Ltd., Nagasaki (JP)

(72) Inventors: Nao Taniguchi, Tokyo (JP); Fumito Hiratani, Tokyo (JP); Takeshi Tsuji, Nagasaki (JP)

(73) Assignee: MITSUBISHI HEAVY INDUSTRIES MARINE MACHINERY & EQUIPMENT CO., LTD., Nagasaki (JP)

(*) Notice: Subject to any disclaimer, the term of this patent is extended or adjusted under 35 U.S.C. 154(b) by 0 days.

(21) Appl. No.: 18/285,318

(22) PCT Filed: Mar. 28, 2022

(86) PCT No.: PCT/JP2022/015028
§ 371 (c)(1),
(2) Date: Oct. 2, 2023

(87) PCT Pub. No.: WO2022/215579
PCT Pub. Date: Oct. 13, 2022

(65) Prior Publication Data
US 2024/0191636 A1 Jun. 13, 2024

(30) Foreign Application Priority Data
Apr. 8, 2021 (JP) ................................ 2021-066025

(51) Int. Cl.
*F01D 25/24* (2006.01)
*F01D 1/08* (2006.01)

(52) U.S. Cl.
CPC .............. *F01D 25/24* (2013.01); *F01D 1/08* (2013.01); *F05D 2220/40* (2013.01); *F05D 2240/14* (2013.01)

(58) Field of Classification Search
CPC ......... F01D 25/24; F05D 2220/40; F02C 7/05
See application file for complete search history.

(56) References Cited

U.S. PATENT DOCUMENTS

| | | | |
|---|---|---|---|
| 4,177,005 A | 12/1979 | Bozung et al. | |
| 6,913,439 B2 * | 7/2005 | Rutschmann | ........... F01D 9/026 415/115 |

(Continued)

FOREIGN PATENT DOCUMENTS

| | | |
|---|---|---|
| GB | 1561338 A | 2/1980 |
| JP | S52-34116 A | 3/1977 |

(Continued)

OTHER PUBLICATIONS

International Search Report Jun. 14, 2022, in counterpart Application No. PCT/JP2022/015028. (10 pages).

(Continued)

*Primary Examiner* — Courtney D Heinle
*Assistant Examiner* — John S Hunter, Jr.
(74) *Attorney, Agent, or Firm* — WHDA, LLP

(57) ABSTRACT

A turbocharger gas casing includes a scroll part forming a plurality of scroll passages at a same position in an axial direction of the turbine. The plurality of scroll passages include a first scroll passage. The first scroll passage is configured so that an extension line of a line segment connecting a farthest position from a rotational axis of the turbine at an inlet for an exhaust gas of the first scroll passage and a position of a tip of a tongue part formed on an inner peripheral side of the first scroll passage does not (Continued)

intersect a rotor blade of the turbine in a cross section of the turbine orthogonal to the axial direction.

12 Claims, 10 Drawing Sheets

(56) References Cited

U.S. PATENT DOCUMENTS

| | | | | |
|---|---|---|---|---|
| 8,579,603 | B2* | 11/2013 | Oklejas | F04D 13/04 417/407 |
| 10,662,870 | B2* | 5/2020 | Wang | F02B 75/18 |

FOREIGN PATENT DOCUMENTS

| | | |
|---|---|---|
| JP | S63-177632 U | 11/1988 |
| JP | S64-11328 U | 1/1989 |
| JP | H06-10602 A | 1/1994 |
| JP | H10-339154 A | 12/1998 |
| JP | H11-303642 A | 11/1999 |
| JP | 2002-349212 A | 12/2002 |
| JP | 2007-146695 A | 6/2007 |
| JP | 2014-066150 A | 4/2014 |
| JP | 2016-132996 A | 7/2016 |
| JP | 6211367 B2 | 10/2017 |
| WO | 2010123786 A2 | 10/2010 |
| WO | 2020/050051 A1 | 3/2020 |

OTHER PUBLICATIONS

Notification of transmittal of Translation of the International Preliminary Report on Patentability (Form PCT/IB/338) issued in counterpart International Application No. PCT/JP2022/015028 mailed Oct. 19, 2023 with Forms PCT/IB/373 and PCT/ISA/237, with English translation. (12 pages).

Extended (Supplementary) European Search Report dated Jul. 8, 2024, issued in counterpart EP application No. 22784563.3. (8 pages).

* cited by examiner

Axial direction (passage height direction)

Axial direction (passage height direction)

Axial direction (passage height direction)

TURBOCHARGER GAS CASING AND TURBOCHARGER

TECHNICAL FIELD

The present disclosure relates to a turbocharger gas casing and a turbocharger.

This application claims the priority of Japanese Patent Application No. 2021-066025 filed on Apr. 8, 2021, the content of which is incorporated herein by reference.

BACKGROUND

In a turbocharger, erosion occurs due to collision of an engine combustion residue with a turbine.

Patent Document 1 describes that a projection projecting radially inward is provided on a passage wall surface of a scroll passage so as to disperse a combustion residue colliding with the passage wall surface, in order to suppress erosion of the scroll passage of a turbine in a supercharger.

CITATION LIST

Patent Literature

Patent Document 1: JPH11-303642A

SUMMARY

Technical Problem

Meanwhile, in a turbine with a double scroll structure having a plurality of scroll passages at the same position in the axial direction of the turbine, an engine combustion residue flowing into the scroll passages easily collides with a rotor blade of the turbine, easily causing erosion of the rotor blade of the turbine. In this regard, Patent Document 1 does not disclose any measures for suppressing the erosion of the rotor blade in the turbine with the double scroll structure.

In view of the above, an object of at least one embodiment of the present disclosure is to provide a turbocharger gas casing and a turbocharger including the same, which are capable of suppressing erosion of a rotor blade in a turbine with a double scroll structure.

Solution to Problem

In order to achieve the above-described object, a turbocharger gas casing according to at least one embodiment of the present disclosure is a turbocharger gas casing of a turbine for a turbocharger, including: a scroll part forming a plurality of scroll passages at a same position in an axial direction of the turbine. The plurality of scroll passages include a first scroll passage. The first scroll passage is configured so that an extension line of a line segment connecting a farthest position from a rotational axis of the turbine at an inlet for an exhaust gas of the first scroll passage and a position of a tip of a tongue part formed on an inner peripheral side of the first scroll passage does not intersect a rotor blade of the turbine in a cross section of the turbine orthogonal to the axial direction.

In order to achieve the above-described object, a turbocharger according to at least one embodiment of the present disclosure, includes: the above-described turbocharger gas casing: a turbine wheel; and a compressor impeller connected to the turbine wheel via a rotational shaft.

Advantageous Effects

According to at least one embodiment of the present disclosure, a turbocharger gas casing and a turbocharger including the same are provided which are capable of suppressing erosion of a rotor blade in a turbine with a double scroll structure.

DETAILED DESCRIPTION

Figure 1:
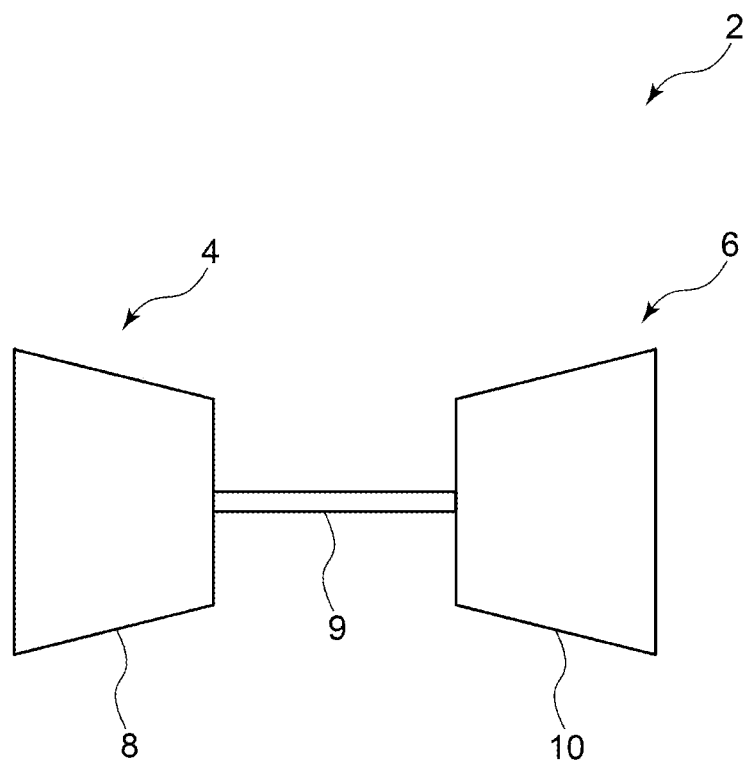
FIG. 1 is a view schematically showing a turbocharger 2 according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a view schematically showing a turbocharger 2 according to an embodiment. The turbocharger 2 may be a marine turbocharger.

As shown in FIG. 1, the turbocharger 2 includes a compressor 4 and a turbine 6 that are interconnected. A compressor impeller 8 of the compressor 4 and a turbine wheel 10 of the turbine 6 are connected via a rotational shaft 9 and are configured to rotate integrally.

If the turbine wheel 10 is driven by an exhaust gas discharged from an engine (not shown), the rotation of the turbine wheel 10 is transmitted to the compressor impeller 8 via the rotational shaft 9, rotating the compressor impeller 8, and air is compressed by the rotation of the compressor impeller 8. The compressed air discharged from the compressor 4 is supplied to the engine (not shown).

Hereinafter, the axial direction of the turbine 6, that is, the axial direction of the rotational shaft 9 is simply referred to as the "axial direction", the circumferential direction of the turbine 6, that is, the circumferential direction of the rotational shaft 9 is simply referred to as the "circumferential direction", and the radial direction of the turbine 6, that is, the radial direction of the rotational shaft 9 is simply referred to as the "radial direction". Further, the exhaust gas discharged from the engine (not shown) and supplied to the turbine 6 is simply referred to as the "exhaust gas".

Figure 2:
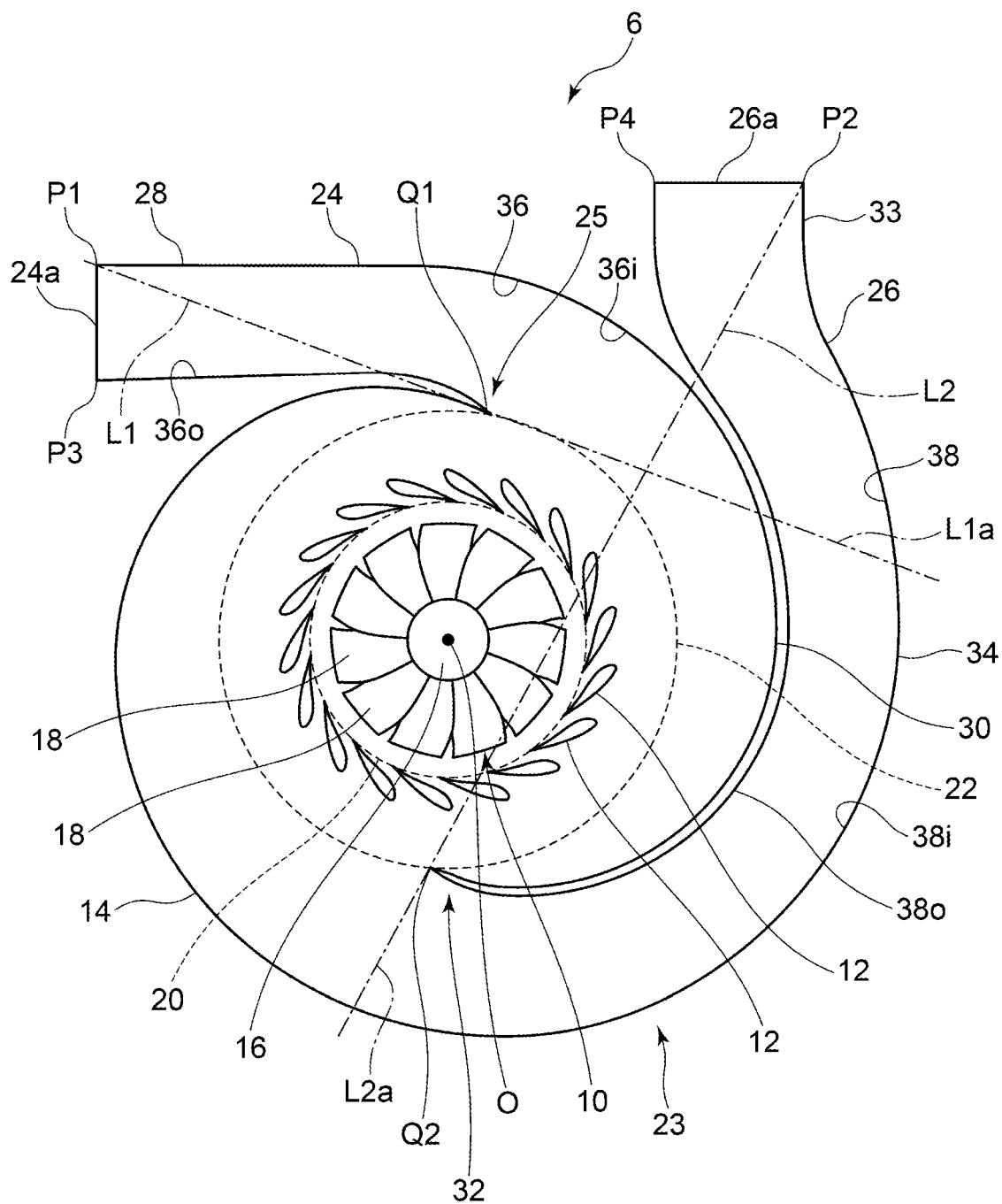
FIG. 2 is a view schematically showing a cross section of a turbine 6 shown in FIG. 1, which is orthogonal to the axial direction.

FIG. 2 is a view schematically showing a cross section of the turbine 6 shown in FIG. 1, which is orthogonal to the axial direction. As shown in FIG. 2, the turbine 6 includes a turbine wheel 10, a plurality of nozzle vanes 12, and a gas casing 14 (turbocharger gas casing).

The turbine wheel 10 includes a hub 16 and a plurality of rotor blades 18 disposed on an outer peripheral surface of the hub 16 at intervals in the circumferential direction.

The plurality of nozzle vanes 12 are disposed on an outer peripheral side of the turbine wheel 10 at intervals in the circumferential direction.

The gas casing 14 includes a wheel housing part 20 for housing the turbine wheel 10, a nozzle path part 22 in which the plurality of nozzle vanes 12 are disposed, and a scroll part 23 for forming a plurality of scroll passages 24, 26 at the same position in the axial direction. The plurality of scroll passages 24, 26 include the scroll passage 24 and the scroll passage 26. Thus, the turbine 6 is a turbine with a double scroll structure which is a structure having the two scroll passages 24, 26 at the same position in the axial direction.

The wheel housing part 20 extends in a cylindrical shape along the axial direction and is configured to introduce an exhaust gas passing through the turbine wheel 10 to an exhaust gas outlet of the turbine 6.

The nozzle path part 22 forms an annular space between the scroll part 23 and the wheel housing part 20. The nozzle path part 22 connects the scroll passage 24 and the wheel housing part 20 in a first range (a range of 180 degrees in the illustrated exemplary form) in the circumferential direction, and connects the scroll passage 26 and the wheel housing part 20 in a second range which is a range excluding the first range in the circumferential direction (a range of 180 degrees excluding the first range in the illustrated form). The exhaust gas having passed through the scroll passage 24 or the scroll passage 26 is introduced to the turbine wheel by the plurality of nozzle vanes 12 disposed in the nozzle path part 22.

The scroll passage 24 and the scroll passage 26 are disposed side by side in the circumferential direction at the same position in the axial direction. In the illustrated exemplary form, an extension direction of the scroll passage 24 at a position of an inlet 24a of the scroll passage 24 (an opening on an inlet side of the scroll passage 24) and an extension direction of the scroll passage 26 at a position of an inlet 26a of the scroll passage 26 (an opening on an inlet side of the scroll passage 26) form an angle of not greater than 180 degrees (approximately 90 degrees in the illustrated example).

As shown in FIG. 2, in the cross section of the turbine 6 orthogonal to the axial direction, letting P1 be a farthest position from a rotational axis O of the turbine 6 at the inlet 24a for the exhaust gas of the scroll passage 24, Q1 be a position of a tip of a tongue part 25 formed on an inner peripheral side of the scroll passage 24, and L1a be an extension line obtained by linearly extending a line segment L1 connecting the position P1 and the position Q1, the scroll passage 24 is curved so that the extension line L1a does not intersect the rotor blade 18 of the turbine 6 in an assembled state of the turbocharger 2. That is, the scroll passage 24 is curved so that the rotor blade 18 of the turbine 6 is invisible from the inlet 24a for the exhaust gas of the scroll passage 24 when the inside of the scroll passage 24 is viewed from the inlet 24a. The position Q1 of the tip of the tongue part 25 corresponds to a position where a downstream end of the scroll passage 26 and the scroll passage 24 are connected.

In the illustrated exemplary form, the scroll passage 24 includes a linear passage part 28 extending linearly and a scroll passage part 30 extending in a scroll shape along the circumferential direction, and the scroll passage part 30 is curved so that the rotor blade 18 of the turbine 6 is invisible from the inlet 24a for the exhaust gas, which is formed in the linear passage part 28, when the inside of the scroll passage 24 is viewed from the inlet 24a.

Further, in the cross section of the turbine 6 orthogonal to the axial direction, the scroll passage 24 is curved so that the above-described extension line L1a does not intersect the nozzle vane 12. That is, the scroll passage 24 is curved so that the nozzle vane 12 is invisible from the inlet 24a for the exhaust gas of the scroll passage 24 when the inside of the scroll passage 24 is viewed from the inlet 24a.

As shown in FIG. 2, in the cross section of the turbine 6 orthogonal to the axial direction, letting P2 be a farthest position from the rotational axis O of the turbine 6 at the inlet 26a for the exhaust gas of the scroll passage 26, Q2 be a position of a tip of a tongue part 32 formed on an inner peripheral side of the scroll passage 26, and L2a be an extension line of a line segment L2 connecting the position P2 and the position Q2, the scroll passage 26 is curved so that the extension line L2a does not intersect the rotor blade 18 of the turbine 6 in the assembled state of the turbocharger 2. That is, the scroll passage 26 is curved so that the rotor blade 18 of the turbine 6 is invisible from the inlet 26a for the exhaust gas of the scroll passage 26 when the inside of the scroll passage 26 is viewed from the inlet 26a. The position Q2 of the tip of the tongue part 32 corresponds to a position where a downstream end of the scroll passage 24 and the scroll passage 26 are connected.

In the illustrated exemplary form, the scroll passage 26 includes a linear passage part 33 extending linearly and a scroll passage part 34 extending in a scroll shape along the circumferential direction, and the scroll passage part 34 is curved so that the rotor blade 18 of the turbine 6 is invisible from the inlet 26a for the exhaust gas, which is formed in the linear passage part 33, when the inside of the scroll passage 26 is viewed from the inlet 26a. The scroll passage part 34 extends along an outer peripheral side of the scroll passage part 30 and is connected to the nozzle path part 22. A downstream end portion of the scroll passage part 34 passes through an inner peripheral side of the linear passage part 28 of the scroll passage 24 and is connected to an inner peripheral end of the scroll passage 24, forming the above-described tongue part 25. A downstream end portion of the scroll passage part 30 passes through an inner peripheral side of the scroll passage part 34 of the scroll passage 26 and is connected to an inner peripheral end of the scroll passage part 34, forming the above-described tongue part 32.

Further, in the cross section of the turbine 6 orthogonal to the axial direction, the scroll passage 26 is curved so that the above-described extension line L2a does not intersect the nozzle vane 12. That is, the scroll passage 26 is curved so that the nozzle vane 12 is invisible from the inlet 26a for the exhaust gas of the scroll passage 26 when the inside of the scroll passage 26 is viewed from the inlet 26a.

As shown in FIG. 2, in the cross section of the turbine 6 orthogonal to the axial direction, an inner wall surface 36 of the scroll passage 24 (a passage wall surface of the scroll passage 24) includes an outward face portion 36o facing radially outward and an inward face portion 36i facing radially inward. In the cross section shown in FIG. 2, letting P3 be a position of the inlet 24a of the scroll passage 24 closest to the rotational axis O of the turbine 6, the outward face portion 36o is a portion, of the inner wall surface 36 of the scroll passage 24, connecting the position P3 and the position Q1. The outward face portion 36o corresponds to a wall surface, of the inner wall surface 36 of the scroll passage 24, located on the inner peripheral side of the scroll passage 24. Further, in the cross section shown in FIG. 2, the inward face portion 36i is a portion, of the inner wall surface 36 of the scroll passage 24, connecting the position P1 and the position Q2 in the scroll passage 24. The inward face portion 36i corresponds to a wall surface, of the inner wall surface 36 of the scroll passage 24, located on the outer peripheral side of the scroll passage 24.

Herein, the surface roughness Ra of the inward face portion 36i (the arithmetic mean roughness of the inward face portion 36i) is greater than the surface roughness Ra of the outward face portion 36o (the arithmetic mean roughness of the outward face portion 36o), and may be, for example, not less than 25 μm.

As shown in FIG. 2, in the cross section of the turbine 6 orthogonal to the axial direction, an inner wall surface 38 of the scroll passage 26 (a passage wall surface of the scroll passage 26) includes an outward face portion 38o facing radially outward and an inward face portion 38i facing radially inward. In the cross section shown in FIG. 2, letting P4 be a position of the inlet 26a of the scroll passage 26 closest to the rotational axis O of the turbine 6, the outward face portion 38o is a portion, of the inner wall surface 38 of the scroll passage 26, connecting the position P4 and the position Q2. The outward face portion 38o corresponds to a wall surface, of the inner wall surface 38 of the scroll passage 26, located on the inner peripheral side of the scroll passage 26. Further, in the cross section shown in FIG. 2, the inward face portion 38i is a portion, of the inner wall surface 38 of the scroll passage 26, connecting the position P2 and the position Q1 in the scroll passage 26. The inward face portion 38i corresponds to a wall surface, of the inner wall surface 38 of the scroll passage 26, located on the outer peripheral side of the scroll passage 26.

Herein, the surface roughness Ra of the inward face portion 38i (the arithmetic mean roughness of the inward face portion 38i) is greater than the surface roughness Ra of the outward face portion 38o (the arithmetic mean roughness of the outward face portion 38o), and may be, for example, not less than 25 μm.

Herein, the effect of the gas casing 14 shown in FIG. 2 will be described in contrast with the configuration shown in FIG. 3.

Figure 3:
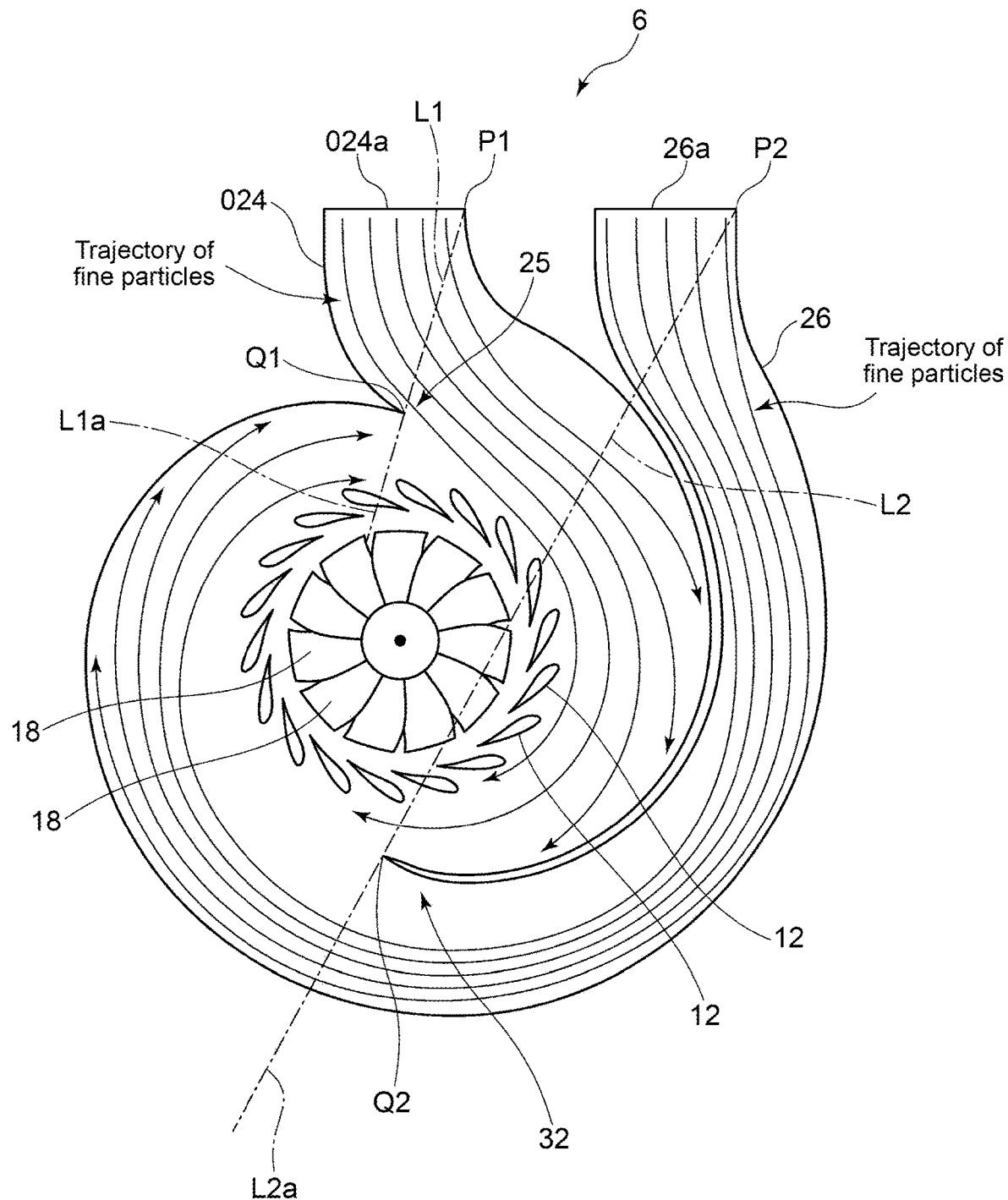
FIG. 3 is a view showing a trajectory (CFD result) of fine particles in each of a scroll passage 024 and a scroll passage 26.
Figure 4:
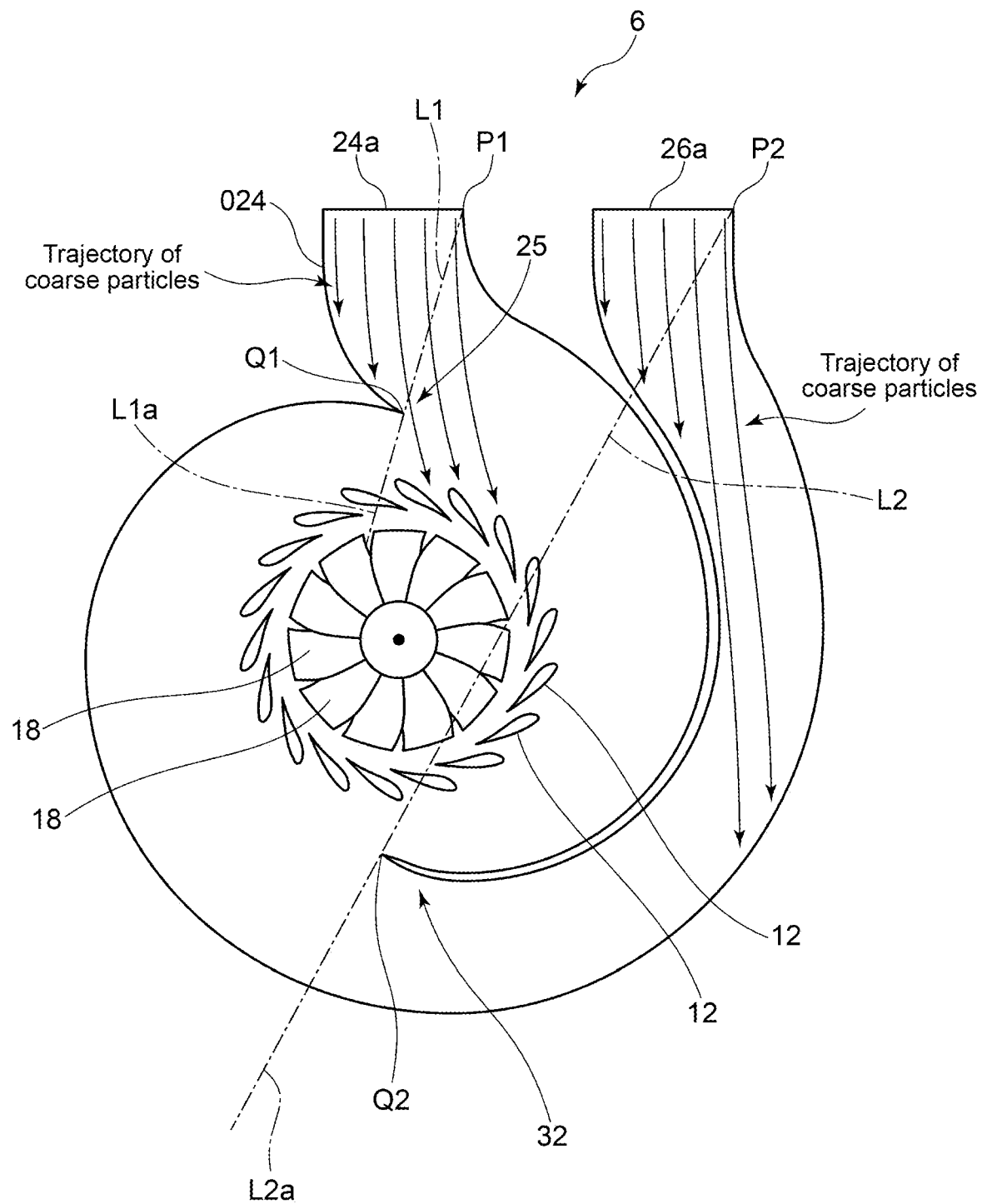
FIG. 4 is a view showing a trajectory (CFD result) of coarse particles in each of the scroll passage 024 and the scroll passage 26.

In a case where the turbine 6 is provided with a scroll passage 024 having a shape shown in FIG. 3 (the scroll passage 024 in which an inlet 024a of the scroll passage 024 and the rotor blade 18 of the turbine 6 linearly communicate with each other so that the above-described extension line L1a intersects the rotor blade 18), fine particles of not greater than several μm of a combustion residue contained in the exhaust gas of the engine (not shown) follow a flow of the exhaust gas as shown in FIG. 3, thereby flowing into a pressure surface (concave surface) side of the rotor blade 18 and passing between the rotor blades 18. On the other hand, in the configuration shown in FIG. 3, coarse particles of not less than 10 μm of the combustion residue contained in the exhaust gas of the engine do not follow the flow of the exhaust gas due to their large inertial force, and collide with a suction surface (convex surface) of the rotor blade 18 of the turbine wheel 10 as shown in FIG. 4, causing erosion of the rotor blade 18.

Figure 5:
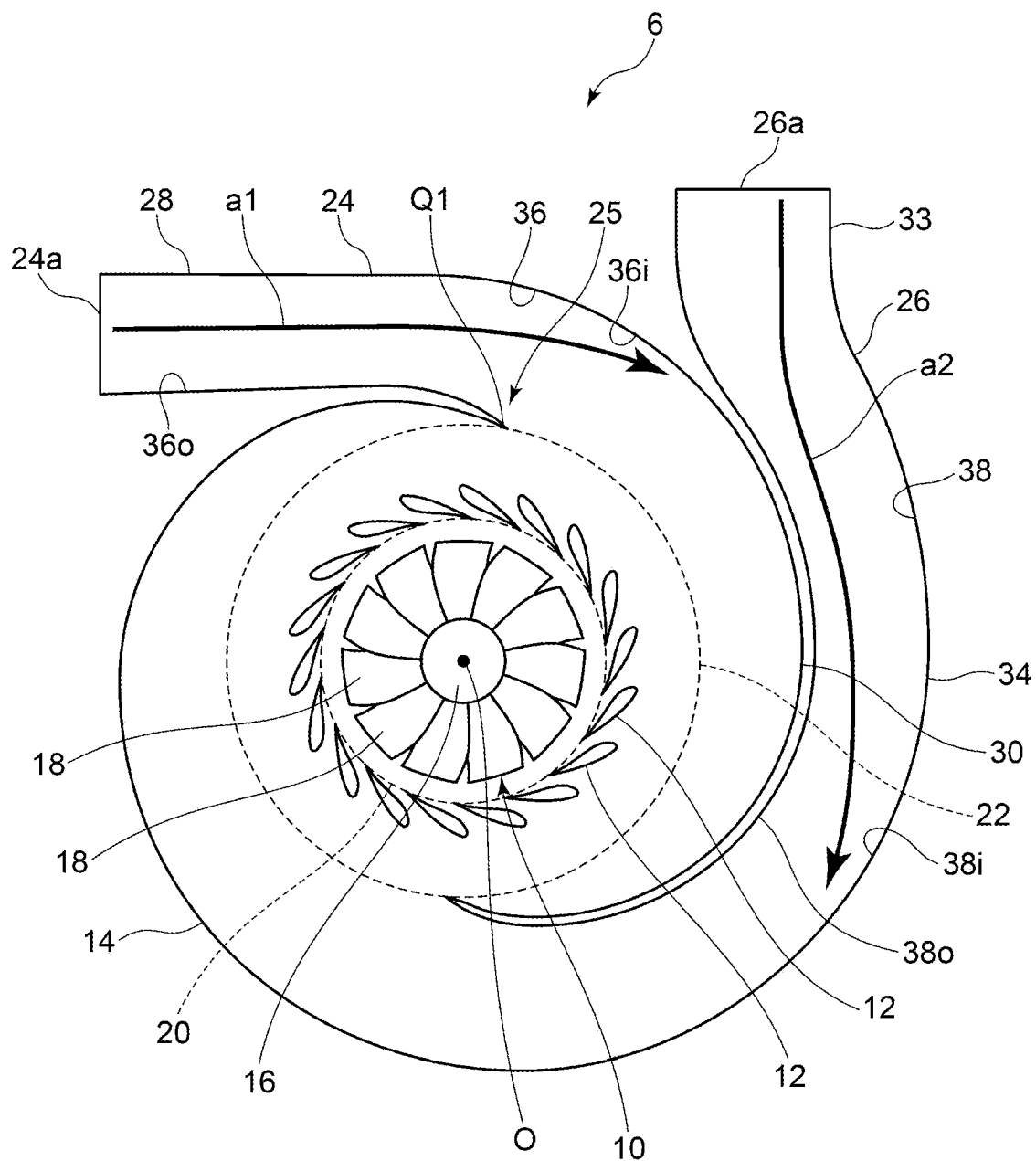
FIG. 5 is a view showing a trajectory of coarse particles in each of a scroll passage 24 and the scroll passage 26.

By contrast, according to the gas casing 14 shown in FIG. 2, since the scroll passage 24 is curved so that the above-described extension line L1a does not intersect the rotor blade 18 of the turbine 6, the coarse particles contained in the exhaust gas collide with the inner wall surface 36 of the scroll passage 24 before colliding with the rotor blade 18, as indicated by an arrow a1 in FIG. 5. Further, according to findings of the present inventors, it is considered that an influence on the erosion of the rotor blade 18 is limited even if the coarse particles colliding with the inner wall surface 36 of the scroll passage 24 subsequently flow downstream. Therefore, direct collision of the coarse particles in the exhaust gas flowing into the scroll passage 24 with the rotor blade 18 of the turbine 6 is suppressed, making it possible to suppress the erosion of the rotor blade 18 of the turbine 6.

Further, since the scroll passage 24 is curved so that the above-described extension line L1a does not intersect the nozzle vane 12 of the turbine 6, the coarse particles contained in the exhaust gas collide with the inner wall surface 36 of the scroll passage 24 before passing between the nozzle vanes 12 adjacent to each other, as indicated by the arrow a1 in FIG. 5. Therefore, introduction of the coarse particles contained in the exhaust gas to the rotor blade 18 of the turbine 6 by the nozzle vane 12 is suppressed, making it possible to effectively suppress the erosion of the rotor blade 18 of the turbine 6.

Further, since the surface roughness Ra of the inward face portion 36i is greater than the surface roughness Ra of the outward face portion 36o, the particles colliding with the inward face portion 36i are easily miniaturized due to friction with the inward face portion 36i as the particles flow downstream. Moreover, an increase in pressure loss in the scroll passage 24 can be suppressed compared to a case where the surface roughness Ra of the inner wall surface 36 of the scroll passage 24 is uniformly increased. Therefore, it is possible to suppress the increase in pressure loss in the scroll passage 24 while effectively suppressing the erosion of the rotor blade 18 of the turbine 6 caused by the combustion residue of the engine.

Further, according to findings of the present inventors, it is considered that the diameter of a particle that greatly influences the erosion of the rotor blade 18 is about 50 μm, and the effect of the miniaturization of the particles due to the friction with the inward face portion 36i is enhanced by setting the surface roughness Ra of the inward face portion 36i to not less than 25 μm, making it possible to effectively suppress the erosion of the rotor blade 18 of the turbine 6.

Further, according to the gas casing shown in FIG. 2, since the scroll passage 26 is curved so that the above-described extension line L2a does not intersect the rotor blade 18 of the turbine 6, the coarse particles contained in the exhaust gas collide with the inner wall surface 38 of the scroll passage 26 before colliding with the rotor blade 18, as indicated by an arrow a2 in FIG. 5. Further, according to findings of the present inventors, it is considered that an influence on the erosion of the rotor blade 18 is limited even if the coarse particles colliding with the inner wall surface 38 of the scroll passage 26 subsequently flow downstream. Therefore, direct collision of the coarse particles in the exhaust gas flowing into the scroll passage 26 with the rotor blade 18 of the turbine 6 is suppressed, making it possible to suppress the erosion of the rotor blade 18 of the turbine 6.

Further, since the scroll passage 24 is curved so that the above-described extension line L2a does not intersect the nozzle vane 12 of the turbine 6, the coarse particles contained in the exhaust gas collide with the inner wall surface 38 of the scroll passage 26 before passing between the nozzle vanes 12 adjacent to each other, as indicated by the arrow a2 in FIG. 5. Therefore, introduction of the coarse particles contained in the exhaust gas to the rotor blade 18 of the turbine 6 by the nozzle vane 12 is suppressed, making it possible to effectively suppress the erosion of the rotor blade 18 of the turbine 6.

Further, since the surface roughness Ra of the inward face portion 38i is greater than the surface roughness Ra of the outward face portion 38o, the particles colliding with the inward face portion 38i are easily miniaturized due to friction with the inward face portion 38i as the particles flow downstream. Moreover, an increase in pressure loss in the scroll passage 26 can be suppressed compared to a case where the surface roughness Ra of the inner wall surface 38 of the scroll passage 26 is uniformly increased. Therefore, it is possible to suppress the increase in pressure loss in the scroll passage 26 while effectively suppressing the erosion of the rotor blade 18 of the turbine 6 caused by the combustion residue of the engine.

Further, according to findings of the present inventors, it is considered that the diameter of a particle that greatly influences the erosion of the rotor blade 18 is about 50 μm, and the effect of the miniaturization of the particles due to the friction with the inward face portion 38i is enhanced by setting the surface roughness Ra of the inward face portion 38i to not less than 25 μm, making it possible to effectively suppress the erosion of the rotor blade 18 of the turbine 6.

Figure 6:
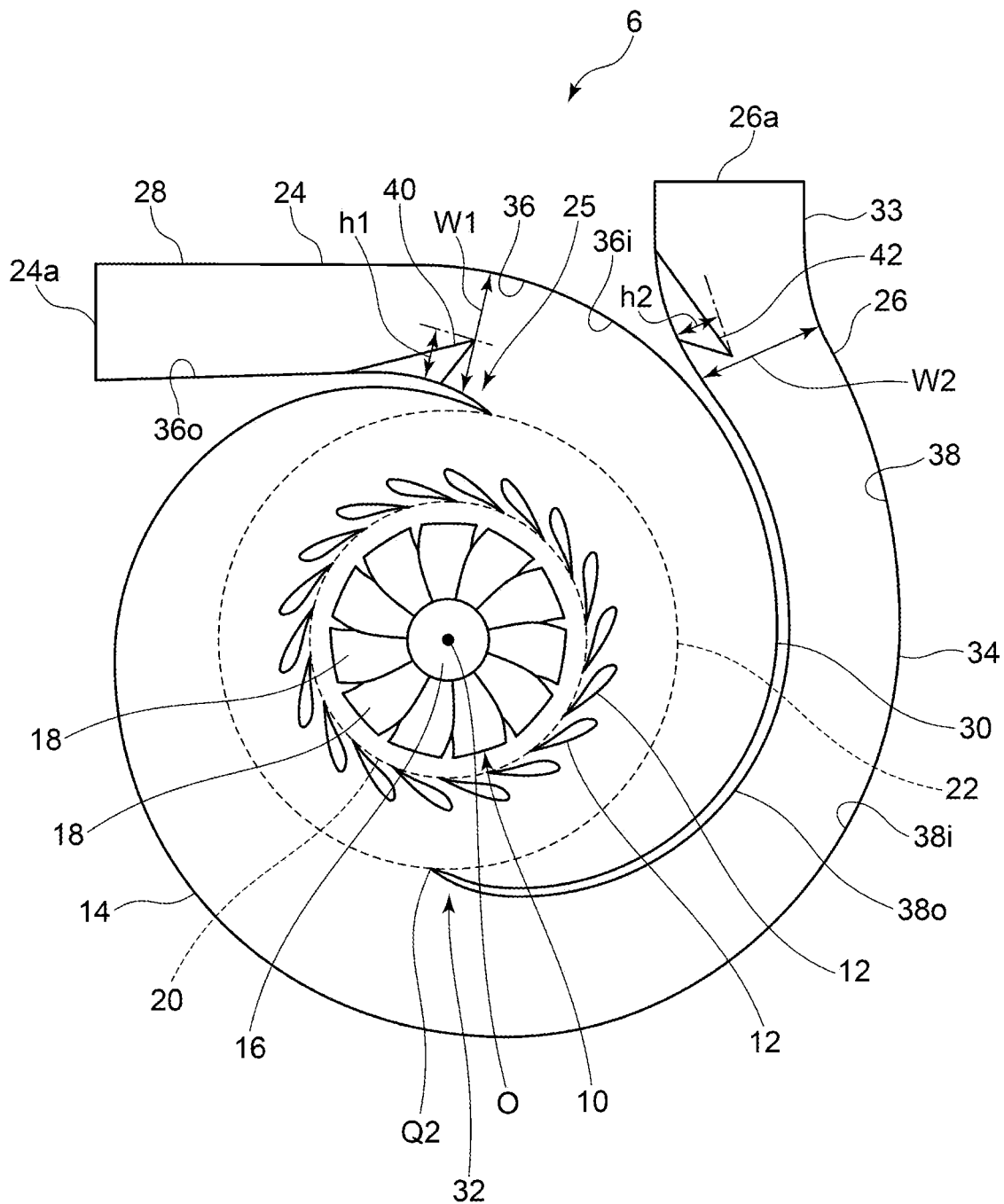
FIG. 6 is a cross-sectional view schematically showing an example of the configuration of the turbine 6 shown in FIG. 2.

In some embodiments, the outward face portion 36o of the above-described scroll passage 24 may include a projection 40 projecting radially outward, as shown in FIG. 6, for example. That is, the outward face portion 36o of the above-described scroll passage 24 may include the projection 40 projecting toward the inward face portion 36i. In the illustrated example, the projection 40 is formed into a triangular shape in the cross section of the turbine 6 orthogonal to the axial direction. Further, the projection 40 is located upstream of the position Q1 of the tip of the tongue part 25.

Further, letting W1 be a passage width at a position of the projection 40 in the scroll passage 24 and in a direction orthogonal to the axial direction, the projection 40 has a height h1 which is at least 20% of the passage width W1. In the illustrated example, the passage width W1 is a passage width at a position of a tip of the projection 40 in the scroll passage 24 and in the direction orthogonal to the axial direction.

Figure 7:
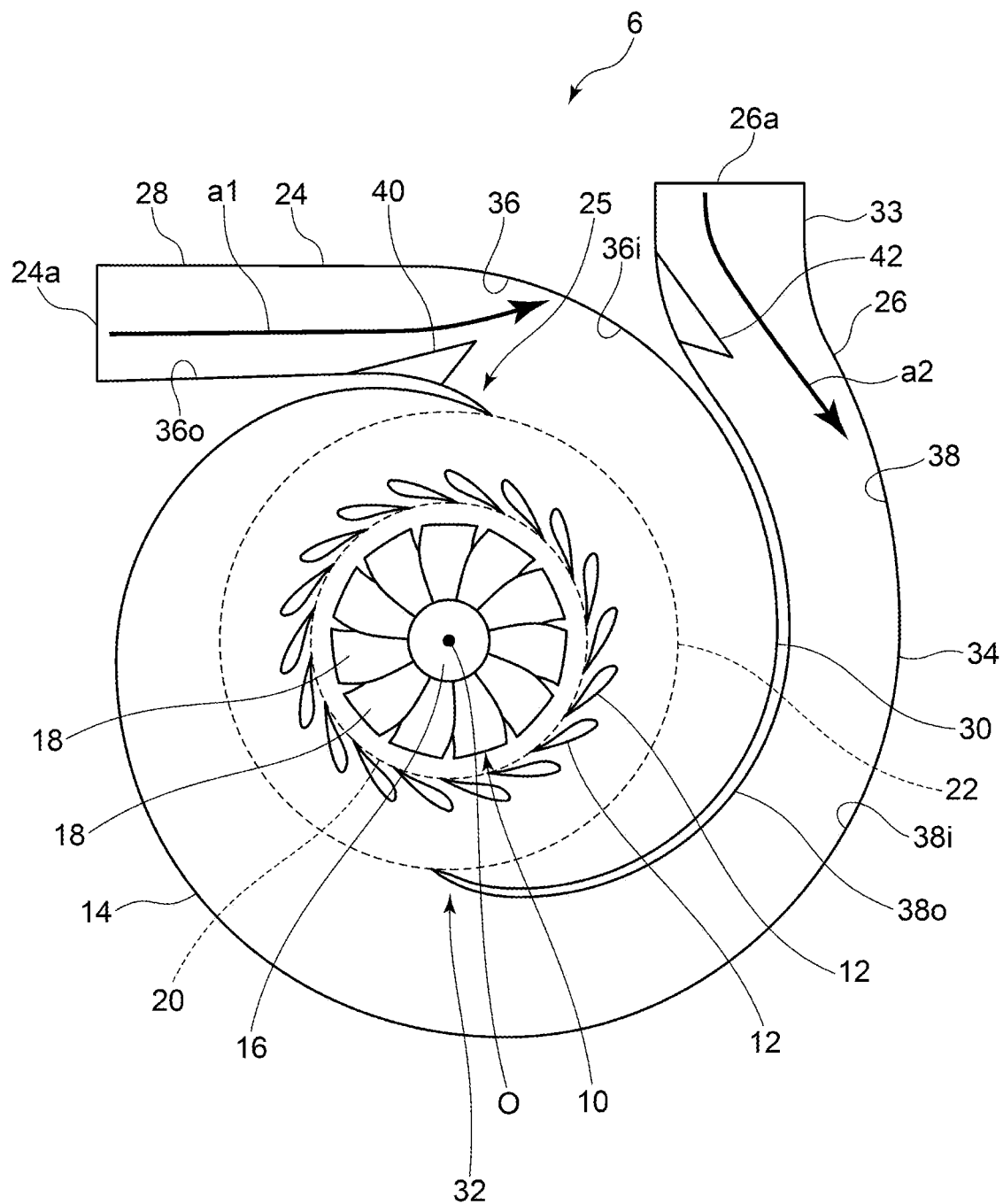
FIG. 7 is a schematic cross-sectional view for describing effects of projections 40 and 42 shown in FIG. 6.

By thus providing the projection 40 on the outward face portion 36o, the particles can be caused to collide with a more upstream position on the inner wall surface 36 of the scroll passage 24 as indicated by the arrow a1 in FIG. 7, and the miniaturization of the particles can be promoted by increasing a time and a distance in which a frictional force from the inner wall surface 36 is received, compared to a case without the projection 40. Therefore, it is possible to effectively suppress the erosion of the rotor blade 18. Further, by setting the height h1 of the projection 40 at at least 20% of the passage width W1, the effect of promoting the miniaturization of the particles can be enhanced compared to a case where the height h1 is set at less than 20% of the passage width W1.

In some embodiments, the outward face portion 38o of the above-described scroll passage 26 may include a projection 42 projecting radially outward, as shown in FIG. 6, for example. That is, the outward face portion 38o of the above-described scroll passage 26 may include the projection 42 projecting toward the inward face portion 38i. In the illustrated example, the projection 42 is formed into a triangular shape in the cross section of the turbine 6 orthogonal to the axial direction. Further, the projection 42 is located upstream of the position Q2 of the tip of the tongue part 32.

Further, letting W2 be a passage width at a position of the projection 42 in the scroll passage 26 and in the direction orthogonal to the axial direction, the projection 42 has a height h2 which is at least 20% of the passage width W2. In the illustrated example, the passage width W2 is a passage width at a position of a tip of the projection 42 in the scroll passage 26 and in the direction orthogonal to the axial direction.

By thus providing the projection 42 on the outward face portion 38o, the particles can be caused to collide with a more upstream position on the inner wall surface 38 of the scroll passage 26 as indicated by the arrow a2 in FIG. 7, and the miniaturization of the particles can be promoted by increasing a time and a distance in which a frictional force from the inner wall surface 38 is received, compared to a case without the projection 42. Therefore, it is possible to effectively suppress the erosion of the rotor blade 18. Further, by setting the height h2 of the projection 42 at least 20% of the passage width W2, the effect of promoting the miniaturization of the particles can be enhanced compared to a case where the height h2 is set at less than 20% of the passage width W2.

Figure 8:
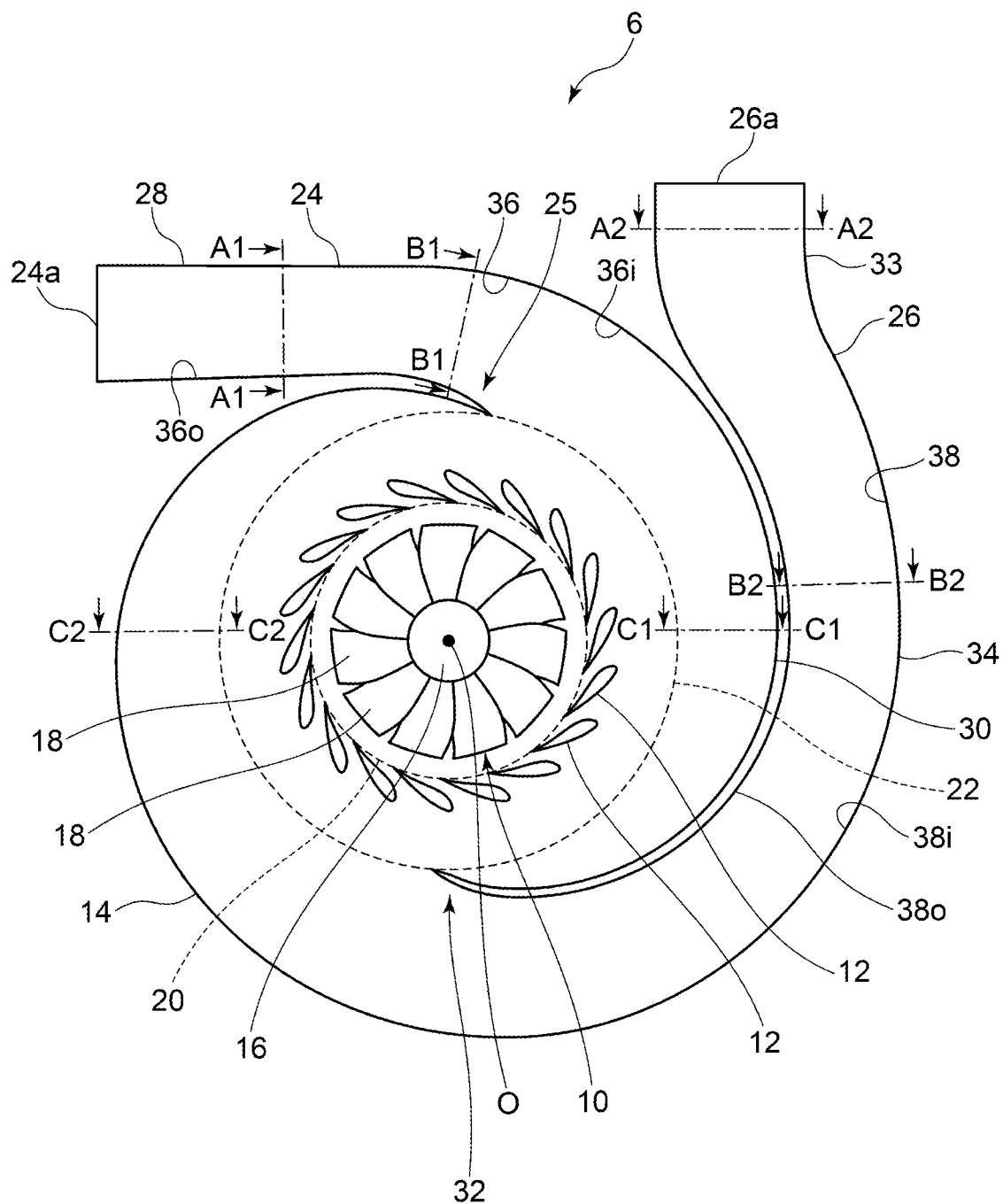
FIG. 8 is a cross-sectional view for describing some examples of the configuration of the turbine 6 shown in FIG. 2.
Figure 9A:
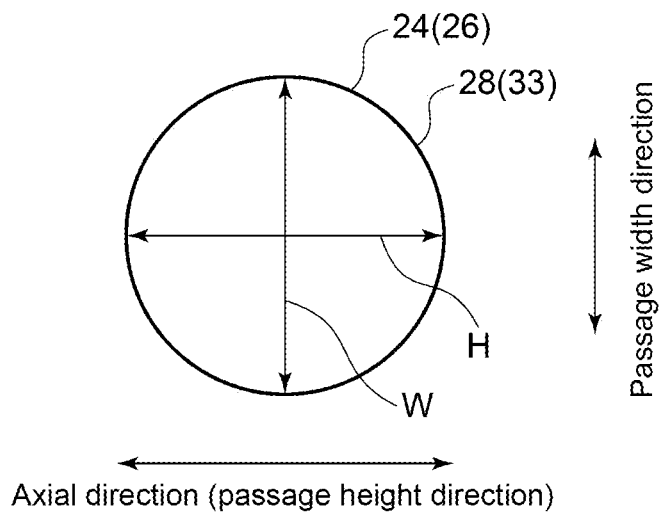
FIG. 9A is a schematic view showing an example of an A1-A1 cross section and an example of an A2-A2 cross section in FIG. 8.
Figure 9B:
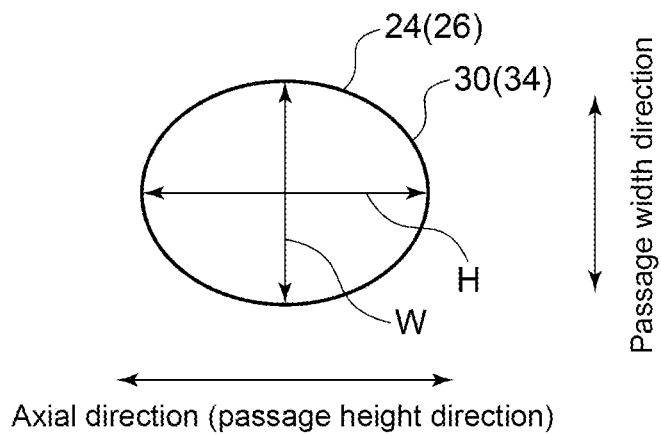
FIG. 9B is a schematic view showing another example of a B1-B1 cross section and another example of a B2-B2 cross section in FIG. 8.
Figure 9C:
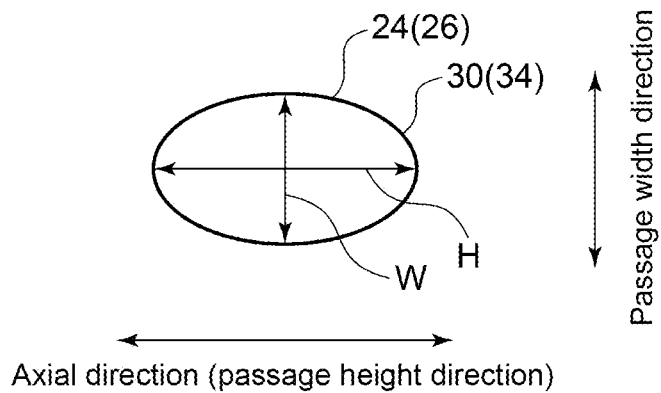
FIG. 9C is a schematic view showing an example of a C1-C1 cross section and an example of a C2-C2 cross section in FIG. 8.

FIG. 9A is a schematic view showing an example of an A1-A1 cross section and an example of an A2-A2 cross section show in FIG. 8, with respect to the turbine 6 shown in FIG. 2. FIG. 9B is a schematic view showing an example of a B1-B1 cross section and an example of a B2-B2 cross section show in FIG. 8, with respect to the turbine 6 shown in FIG. 2. FIG. 9C is a schematic view showing an example of a C1-C1 cross section and an example of a C2-C2 cross section shown in FIG. 8, with respect to the turbine 6 shown in FIG. 2. Each of the A1-A1 cross section, the B1-B1 cross section, and the C1-C1 cross section schematically shows a passage cross section of the scroll passage 24 orthogonal to an extension direction of the scroll passage 24. Each of the A2-A2 cross section, the B2-B2 cross section, and the C2-C2 cross section schematically shows a passage cross section of the scroll passage 26 orthogonal to an extension direction of the scroll passage 26.

In some embodiments, as shown in FIG. 9A, the linear passage part 28 of the scroll passage 24 includes a circular passage cross section. Further, as shown in FIGS. 9B and 9C, the scroll passage part 30 of the scroll passage 24 has a passage cross section where a passage height H in the axial direction is greater than a passage width W in the direction orthogonal to the axial direction (a passage width direction orthogonal to each of the axial direction and the extension direction of the scroll passage 24).

In the examples shown in FIGS. 9B and 9C, the scroll passage part 30 of the scroll passage 24 has an elliptical passage cross section such that the passage height H in the axial direction is greater than the passage width W in the direction orthogonal to the axial direction. In the illustrated example, a major axis of the elliptical passage cross section extends along the axial direction, and a minor axis of the elliptical passage cross section extends along the direction orthogonal to the axial direction. The major axis of the elliptical passage cross section may extend parallel to the axial direction, and the minor axis of the elliptical passage cross section may extend in the direction orthogonal to the axial direction.

Further, the passage cross section of the scroll passage 24 is formed into a circular shape over an entire section in the linear passage part 28, and may be formed into an elliptical shape such that the passage height H in the axial direction is greater than the passage width W in the direction orthogonal to the axial direction over the entire section in the scroll passage part 30.

Further, as shown in FIGS. 9B and 9C, the scroll passage 24 may be formed such that a ratio H/W of the passage height H in the axial direction to the passage width W in the direction orthogonal to the axial direction increases toward the downstream side of the scroll passage part 30.

As described above, since the passage height H in the axial direction is greater than the passage width W in the passage cross section of the scroll passage part 30 in the scroll passage 24, contribution of a portion, on the inner wall surface 36 of the scroll passage 24, with which the particles collide is increased to promote miniaturization of the particles due to friction between the particles and the inner wall surface 36 of the scroll passage 24, making it possible to effectively reduce the erosion of the rotor blade 18 of the turbine 6.

Further, since the scroll passage 24 is formed such that the ratio H/W of the passage height H in the axial direction to the passage width W in the direction orthogonal to the axial direction increases toward the downstream side of the scroll passage part 30, it is possible to promote the miniaturization of the particles due to the friction between the particles and the inner wall surface 36 of the scroll passage 24 while suppressing an increase in pressure loss caused by a change in shape of the passage.

In some embodiments, as shown in FIG. 9A, the linear passage part 33 of the scroll passage 26 includes a circular passage cross section. Further, as shown in FIGS. 9B and 9C, the scroll passage part 34 of the scroll passage 26 has a passage cross section where the passage height H in the axial direction is greater than the passage width W in the direction orthogonal to the axial direction (a passage width direction orthogonal to each of the axial direction and the extension direction of the scroll passage 26). In the examples shown in FIGS. 9B and 9C, the scroll passage part 34 of the scroll passage 26 has an elliptical passage cross section such that the passage height H in the axial direction is greater than the passage width W in the direction orthogonal to the axial direction. In the illustrated example, a major axis in the elliptical passage cross section extends along the axial direction, and a minor axis in the elliptical passage cross section extends along the direction orthogonal to the axial direction. The major axis in the elliptical passage cross section may extend parallel to the axial direction, and the minor axis in the elliptical passage cross section may extend in the direction orthogonal to the axial direction.

Further, the passage cross section of the scroll passage 26 is formed into a circular shape over an entire section in the linear passage part 33 as shown in FIG. 9A, and may be formed into an elliptical shape such that the passage height H in the axial direction is greater than the passage width W in the direction orthogonal to the axial direction over the entire section in the scroll passage part 34 as shown in FIGS. 9B and 9C.

Further, as shown in FIGS. 9B and 9C, the scroll passage 26 may be formed such that the ratio H/W of the passage height H in the axial direction to the passage width W in the direction orthogonal to the axial direction increases toward the downstream side of the scroll passage part 34.

As described above, since the passage height H in the axial direction is greater than the passage width W in the passage cross section of the scroll passage part 34 in the scroll passage 26, contribution of a portion, on the inner wall surface 38 of the scroll passage 26, with which the particles collide, is increased to promote miniaturization of the particles due to friction between the particles and the inner wall surface 38 of the scroll passage 26, making it possible to effectively reduce the erosion of the rotor blade 18 of the turbine 6.

Further, since the scroll passage 26 is formed such that the ratio H/W of the passage height H in the axial direction to the passage width W in the direction orthogonal to the axial direction increases toward the downstream side of the scroll passage part 34, it is possible to promote the miniaturization of the particles due to the friction between the particles and the inner wall surface 38 of the scroll passage 26 while suppressing an increase in pressure loss caused by a change in shape of the passage.

Figure 10A:
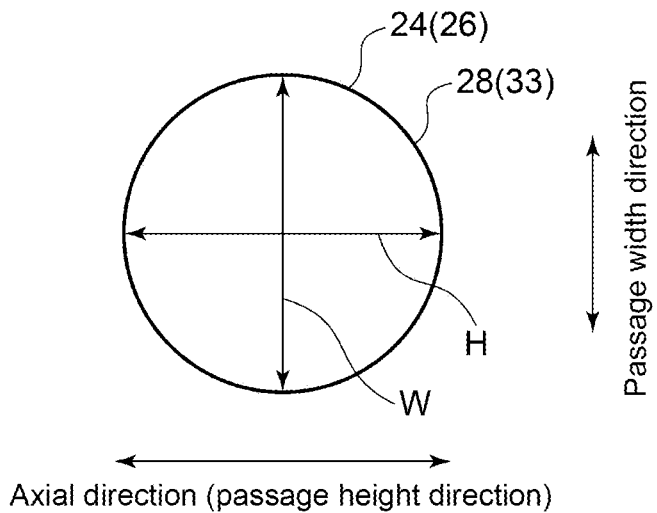
FIG. 10A is a schematic view showing another example of the A1-A1 cross section and another example of the A2-A2 cross section in FIG. 8.
Figure 10B:
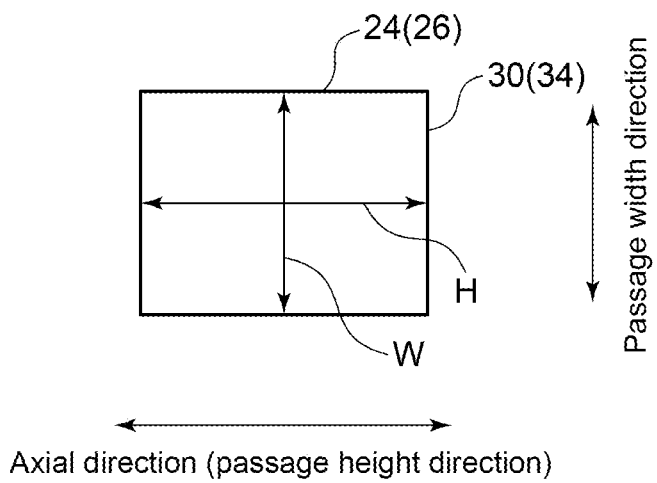
FIG. 10B is a schematic view showing another example of the B1-B1 cross section and another example of the B2-B2 cross section in FIG. 8.
Figure 10C:
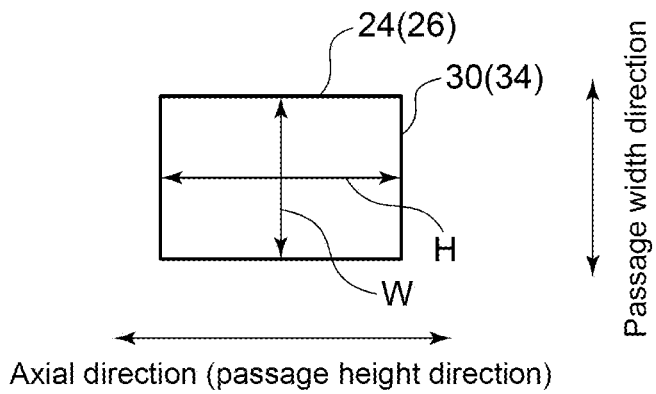
FIG. 10C is a schematic view showing another example of the C1-C1 cross section and another example of the C2-C2 cross section in FIG. 8.

FIG. 10A is a schematic view showing another example of the A1-A1 cross section and another example of the A2-A2 cross section shown in FIG. 8, with respect to the turbine 6 shown in FIG. 2. FIG. 10B is a schematic view showing another example of the B1-B1 cross section and another example of the B2-B2 cross section shown in FIG. 8, with respect to the turbine 6 shown in FIG. 2. FIG. 10C is a schematic view showing another example of the C1-C1 cross section and another example of the C2-C2 cross section shown in FIG. 8, with respect to the turbine 6 shown in FIG. 2. Each of the A1-A1 cross section, the B1-B1 cross section, and the C1-C1 cross section schematically shows the passage cross section of the scroll passage 24 orthogonal to the extension direction of the scroll passage 24. Each of the A2-A2 cross section, the B2-B2 cross section, and the C2-C2 cross section schematically shows the passage cross section of the scroll passage 26 orthogonal to the extension direction of the scroll passage 26.

In some embodiments, as shown in FIG. 10A, the linear passage part 28 of the scroll passage 24 includes a circular passage cross section. Further, as shown in FIGS. 10B and 10C, the scroll passage part 30 of the scroll passage 24 has a passage cross section where the passage height H in the axial direction is greater than the passage width W in the direction orthogonal to the axial direction (a direction orthogonal to each of the axial direction and the extension direction of the scroll passage 24). In the examples shown in FIGS. 10B and 10C, the scroll passage part 30 of the scroll passage 24 has an oblong (rectangular) passage cross section such that the passage height H in the axial direction is greater than the passage width W in the direction orthogonal to the axial direction. In the illustrated example, a long side of the oblong passage cross section extends along the axial direction, and a short side of the oblong passage cross section extends along the direction orthogonal to the axial direction. The long side of the oblong passage cross section may extend parallel to the axial direction, and the short side of the oblong passage cross section may extend in the direction orthogonal to the axial direction.

Further, the passage cross section of the scroll passage 24 is formed into a circular shape over an entire section in the linear passage part 28 as shown in FIG. 10A, and may be formed such that the passage height H in the axial direction is greater than the passage width W in the direction orthogonal to the axial direction over the entire section in the scroll passage part 30 as shown in FIGS. 10B and 10C.

Further, as shown in FIGS. 10B and 10C, the scroll passage 24 may be formed such that the ratio H/W of the passage height H in the axial direction to the passage width W in the direction orthogonal to the axial direction increases toward the downstream side of the scroll passage part 30.

As described above, since the passage height H in the axial direction is greater than the passage width W in the passage cross section of the scroll passage part 30 in the scroll passage 24, the contribution of the portion, on the inner wall surface 36 of the scroll passage 24, with which the particles collide, is increased to promote the miniaturization of the particles due to the friction between the particles and the inner wall surface 36 of the scroll passage 24, making it possible to effectively reduce the erosion of the rotor blade 18 of the turbine 6.

Further, since the scroll passage 24 is formed such that the ratio H/W of the passage height H in the axial direction to the passage width W in the direction orthogonal to the axial direction increases toward the downstream side of the scroll passage part 30, it is possible to promote the miniaturization of the particles due to the friction between the particles and the inner wall surface 36 of the scroll passage 24 while suppressing an increase in pressure loss caused by a change in shape of the passage.

In some embodiments, as shown in FIG. 10A, the linear passage part 33 of the scroll passage 26 includes a circular passage cross section. Further, as shown in FIGS. 10B and 10C, the scroll passage part 34 of the scroll passage 26 has a passage cross section where a passage height H in the axial direction is greater than a passage width W in the direction orthogonal to the axial direction (a passage width direction orthogonal to each of the axial direction and the extension direction of the scroll passage 26). In the examples shown in FIGS. 10B and 10C, the scroll passage part 34 of the scroll passage 26 has an oblong passage cross section such that the passage height h in the axial direction is greater than the passage width W in the direction orthogonal to the axial direction. In the illustrated example, a long side of the oblong passage cross section extends along the axial direction, and a short side of the oblong passage cross section extends along the direction orthogonal to the axial direction. The long side of the oblong passage cross section may extend parallel to the axial direction, and the short side of the oblong passage cross section may extend in the direction orthogonal to the axial direction.

Further, the passage cross section of the scroll passage 26 is formed into a circular shape over an entire section in the linear passage part 33 as shown in FIG. 10A, and may be formed into an oblong shape such that the passage height h in the axial direction is greater than the passage width W in the direction orthogonal to the axial direction over the entire section in the scroll passage part 34 as shown in FIGS. 10B and 10C.

Further, as shown in FIGS. 10B and 10C, the scroll passage 26 may be formed such that the ratio H/W of the passage height H in the axial direction to the passage width W in the direction orthogonal to the axial direction increases toward the downstream side of the scroll passage part 34.

As described above, since the passage height H in the axial direction is greater than the passage width W in the passage cross section of the scroll passage part 34 in the scroll passage 26, the contribution of the portion, on the inner wall surface 38 of the scroll passage 26, with which the particles collide, is increased to promote the miniaturization of the particles due to the friction between the particles and the inner wall surface 38 of the scroll passage 26, making it possible to effectively reduce the erosion of the rotor blade 18 of the turbine 6.

Further, since the scroll passage 26 is formed such that the ratio H/W of the passage height H in the axial direction to the passage width W in the direction orthogonal to the axial direction increases toward the downstream side of the scroll passage part 34, it is possible to promote the miniaturization of the particles due to the friction between the particles and the inner wall surface 38 of the scroll passage 26 while suppressing an increase in pressure loss caused by a change in shape of the passage.

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A turbocharger gas casing according to at least one embodiment of the present disclosure is a turbocharger gas casing (such as the above-described gas casing 14) of a turbine (such as the above-described turbine 6) for a turbocharger (such as the above-described turbocharger 2), including: a scroll part (such as the above-described scroll part 23) forming a plurality of scroll passages (such as the above-described scroll passage 24 and scroll passage 26) at a same position in an axial direction of the turbine. The plurality of scroll passages include a first scroll passage (such as the above-described scroll passage 24 or scroll passage 26). The first scroll passage is configured so that an extension line (such as the above-described extension line L1a or L2a) of a line segment connecting a farthest position (such as the above-described position P1 or P2) from a rotational axis of the turbine at an inlet (such as the above-described inlet 24a or 26a) for an exhaust gas of the first scroll passage and a position (such as the above-described position Q1 or Q2) of a tip of a tongue part formed on an inner peripheral side of the first scroll passage does not intersect a rotor blade (such as the above-described rotor blade 18) of the turbine in a cross section of the turbine orthogonal to the axial direction.

According to the turbocharger gas casing as defined in the above (1), since the first scroll passage is configured so that the above-described extension line does not intersect the rotor blade of the turbine, the coarse particles contained in the exhaust gas collide with the inner wall surface of the first scroll passage before colliding with the rotor blade. Further, according to findings of the present inventors, it is considered that an influence on the erosion of the rotor blade is limited even if the coarse particles colliding with the inner wall surface of the first scroll passage subsequently flow downstream. Therefore, direct collision of the coarse particles contained in the exhaust gas flowing into the first scroll passage with the rotor blade of the turbine is suppressed, making it possible to suppress the erosion of the rotor blade of the turbine.

(2) In some embodiments, in the turbocharger gas casing as defined in the above (1), the first scroll passage is configured so that the extension line does not intersect a nozzle vane (such as the above-described nozzle vane 2) for introducing a flow to the rotor blade of the turbine.

According to the turbocharger gas casing as defined in the above (2), the coarse particles contained in the exhaust gas collide with the inner wall surface of the first scroll passage before passing between the nozzle vanes adjacent to each other. Therefore, introduction of the coarse particles contained in the exhaust gas to the rotor blade of the turbine by the nozzle vane is suppressed, making it possible to effectively suppress the erosion of the rotor blade of the turbine.

(3) In some embodiments, in the turbocharger gas casing as defined in the above (1) or (2), an inner wall surface (such as the above-described inner wall surface 36 or 38) of the first scroll passage includes: an outward face portion (such as the above-described outward face portion 36o or 38o) facing outward in a radial direction of the turbine; and an inward face portion (such as the above-described inward face portion 36i or 38i) facing inward in the radial direction of the turbine, the inward face portion having a surface roughness Ra greater than that of the outward face portion.

According to the turbocharger gas casing as defined in the above (3), since the surface roughness Ra of the inward face portion is greater than the surface roughness of the outward face portion, the particles colliding with the inward face portion are easily miniaturized due to friction with the inward face portion as the particles flow downstream. Moreover, an increase in pressure loss in the first scroll passage can be suppressed compared to a case where the surface roughness of the inner wall surface of the first scroll passage is increased as a whole. Therefore, it is possible to suppress the increase in pressure loss in the first scroll passage while effectively suppressing the erosion of the rotor blade of the turbine caused by the combustion residue of the engine.

(4) In some embodiments, in the turbocharger gas casing as defined in the above (3), the surface roughness Ra of the inward face portion is not less than 25 μm.

According to findings of the present inventors, it is considered that the diameter of a particle that greatly influences the erosion of the rotor blade is about 50 μm, and the effect of the miniaturization of the particles due to the friction with the inward face portion is enhanced by setting the surface roughness Ra of the inward face portion to not less than 25 μm as defined in the above (4), making it possible to effectively suppress the erosion of the rotor blade of the turbine.

(5) In some embodiments, in the turbocharger gas casing as defined in any of the above (1) to (4), an inner wall surface (such as the above-described inner wall surface 36 or 38) of the first scroll passage includes: an outward face portion (such as the above-described outward face portion 36o or 38o) facing outward in a radial direction of the turbine; and an inward face portion (such as the above-described inward face portion 36i or 38i) facing inward in the radial direction of the turbine, and the outward face portion includes a projection (such as the above-described projection 40 or 42) projecting outward in the radial direction.

According to the turbocharger gas casing as defined in the above (5), the particles can be caused to collide with a more upstream position on the inner wall surface of the first scroll passage, and the miniaturization of the particles can be promoted by increasing a time and a distance in which a frictional force from the inner wall surface is received, compared to a case without the projection. Therefore, it is possible to effectively suppress the erosion of the rotor blade.

(6) In some embodiments, in the turbocharger gas casing as defined in the above (5), the projection is located upstream of the position of the tip of the tongue part.

According to the turbocharger gas casing as defined in the above (6), the particles can be caused to collide with the more upstream position on the inner wall surface of the first scroll passage, and the miniaturization of the particles can be promoted by increasing the time and the distance in which the frictional force from the inner wall surface is received, compared to the case without the projection upstream of the position of the tip of the tongue part. Therefore, it is possible to effectively suppress the erosion of the rotor blade.

(7) In some embodiments, in the turbocharger gas casing as defined in the above (5) or (6), the projection has a height (such as the above-described height h1 or h2) which is at least 20% of a passage width (such as the above-described passage width W1 or W2) of the first scroll passage in a direction orthogonal to the axial direction.

According to the turbocharger gas casing as defined in the above (7), the effect of promoting the miniaturization of the particles can be enhanced compared to a case where the height of the projection is set at less than 20% of the passage width of the first scroll passage in the direction orthogonal to the axial direction.

(8) In some embodiments, in the turbocharger gas casing as defined in any of the above (1) to (7), the first scroll passage includes a passage cross section in which a passage height (such as the above-described passage height H) in the axial direction is greater than a passage width (such as the above-described passage width W) in a direction orthogonal to the axial direction.

According to the turbocharger gas casing as defined in the above (8), since the passage height in the axial direction is greater than the passage width in the passage cross section of the first scroll passage, the contribution of the portion, on the inner wall surface of the first scroll passage, with which the particles collide, is increased to promote the miniaturization of the particles due to the friction between the particles and the inner wall surface of the first scroll passage, making it possible to effectively reduce the erosion of the rotor blade of the turbine.

(9) In some embodiments, in the turbocharger gas casing as defined in the above (8), the passage cross section has an elliptical shape or a rectangular shape.

According to the turbocharger gas casing as defined in the above (9), it is possible to achieve the effect as described in the above (8) with the simple shape.

(10) A turbocharger according to at least one embodiment of the present disclosure, includes: the turbocharger gas casing as defined in any of the above (1) to (9): a turbine wheel (such as the above-described turbine wheel 10); and a compressor impeller (such as the above-described compressor impeller 8) connected to the turbine wheel via a rotational shaft.

According to the turbocharger as defined in the above (10), since the turbocharger casing as defined in any of the above (1) to (9) is provided, it is possible to suppress the erosion of the rotor blade of the turbine and it is possible to improve the reliability of the turbocharger.

REFERENCE SIGNS LIST

2 Turbocharger
4 Compressor
6 Turbine
8 Compressor impeller
9 Rotational shaft
10 Turbine wheel
12 Nozzle vane
14 Gas casing
16 Hub
18 Rotor blade
20 Wheel housing part
22 Nozzle path part
23 Scroll part
24 First scroll passage
24a Inlet
25 Tongue part
26 Second scroll passage
26a Inlet
28 Linear passage part
30 Scroll passage part
32 Tongue part
33 Linear passage part
34 Scroll passage part
36 Inner wall surface
36i Inward face portion
36o Outward face portion
38 Inner wall surface
38i Inward face portion
38o Outward face portion
40 Projection
42 Projection

The invention claimed is:

1. A turbocharger gas casing of a turbine for a turbocharger, comprising:
a scroll part forming a plurality of scroll passages at a same position in an axial direction of the turbine,
wherein the plurality of scroll passages include a first scroll passage,
wherein the first scroll passage is configured so that an extension line of a line segment connecting a farthest position from a rotational axis of the turbine at an inlet for an exhaust gas of the first scroll passage and a position of a tip of a tongue part formed on an inner peripheral side of the first scroll passage does not intersect a rotor blade of the turbine in a cross section of the turbine orthogonal to the axial direction,
wherein a first scroll passage includes a first scroll passage part extending along a circumferential direction of the turbine, and wherein the first scroll passage is formed such that a ratio H/W of a passage height H in the axial direction to a passage width W in a direction orthogonal to the axial direction increases toward a downstream side of the first scroll passage part.

2. The turbocharger gas casing according to claim 1,
wherein the first scroll passage is configured so that the extension line does not intersect a nozzle vane for introducing a flow to the rotor blade of the turbine.

3. The turbocharger gas casing according to claim 1,
wherein an inner wall surface of the first scroll passage includes:
an outward face portion facing outward in a radial direction of the turbine; and
an inward face portion facing inward in the radial direction of the turbine, and
wherein the outward face portion includes a projection projecting outward in the radial direction.

4. The turbocharger gas casing according to claim 3,
wherein the projection is located upstream of the position of the tip of the tongue part.

5. The turbocharger gas casing according to claim 3,
wherein the projection has a height which is at least 20% of a passage width of the first scroll passage in a direction orthogonal to the axial direction.

6. The turbocharger gas casing according to claim 1,
wherein the first scroll passage includes a passage cross section in which a passage height in the axial direction is greater than a passage width in a direction orthogonal to the axial direction.

7. The turbocharger gas casing according to claim 6,
wherein the passage cross section has an elliptical shape or a rectangular shape.

8. A turbocharger, comprising:
the turbocharger gas casing according to claim 1;
a turbine wheel; and
a compressor impeller connected to the turbine wheel via a rotational shaft.

9. The turbocharger gas casing according to claim 1,
wherein the first scroll passage includes a linear passage part extending
linearly,
wherein the inlet is formed in the linear passage part,
wherein the linear passage part includes a circular passage cross section,
and
wherein the first scroll passage part has a passage cross section where the passage height in the axial direction is greater than the passage width in the direction orthogonal to the axial direction.

10. The turbocharger gas casing according to claim 9,
wherein a passage cross section of the first scroll passage is formed into a circular shape over an entire section in the linear passage part, and a passage cross section of the first scroll passage is formed such that the passage height in the axial direction is greater than the passage width in the direction orthogonal to the axial direction over the entire section in the first scroll passage part.

11. A turbocharger gas casing of a turbine for a turbocharger, comprising:
a scroll part forming a plurality of scroll passages at a same position in an axial direction of the turbine,
wherein the plurality of scroll passages include a first scroll passage,
wherein the first scroll passage is configured so that an extension line of a line segment connecting a farthest position from a rotational axis of the turbine at an inlet for an exhaust gas of the first scroll passage and a position of a tip of a tongue part formed on an inner peripheral side of the first scroll passage does not intersect a rotor blade of the turbine in a cross section of the turbine orthogonal to the axial direction, and
wherein an inner wall surface of the first scroll passage includes:
- an outward face portion facing outward in a radial direction of the turbine; and
- an inward face portion facing inward in the radial direction of the turbine, the inward face portion having a surface roughness Ra greater than that of the outward face portion.

12. The turbocharger gas casing according to claim 11, wherein the surface roughness Ra of the inward face portion is not less than 25 μm.

* * * * *